United States Patent [19]

Heishi

[11] Patent Number: 4,974,654
[45] Date of Patent: Dec. 4, 1990

[54] PNEUMATIC TIRE REINFORCED BY STEEL CORDS WITH TAPERED ENDS

[75] Inventor: Seiichiro Heishi, Kyoto, Japan

[73] Assignee: Toyo Tire & Rubber Co., Ltd., Osaka, Japan

[21] Appl. No.: 437,313

[22] Filed: Nov. 17, 1989

Related U.S. Application Data

[63] Continuation of Ser. No. 113,966, Oct. 29, 1987, abandoned.

[30] Foreign Application Priority Data

Oct. 31, 1986 [JP] Japan .................. 61-260957

[51] Int. Cl.⁵ .............. B60C 9/00; D02G 3/48
[52] U.S. Cl. .................. 152/451; 57/902; 152/527
[58] Field of Search ............. 152/527, 526, 556, 451, 152/548; 57/902, 217, 212, 239; 428/295

[56] References Cited

U.S. PATENT DOCUMENTS 3,273,978  9/1966  Paul .................. 428/295 X

FOREIGN PATENT DOCUMENTS 0001235  4/1979  European Pat. Off. .
1290294  3/1962  France .
52-75702  6/1977  Japan ................. 152/451
55-28882  7/1980  Japan .
1014112  12/1965  United Kingdom .
2009270  6/1979  United Kingdom .

OTHER PUBLICATIONS

Research Disclosure, vol. 177, No. 138, Oct. 1975, pp. 14–15, Disclosure No. 13827.

Primary Examiner—Michael W. Ball
Assistant Examiner—Adrienne C. Johnstone
Attorney, Agent, or Firm—Saidman, Sterne, Kessler & Goldstein

[57] ABSTRACT

A pneumatic tire reinforced by steel cords embedded as a reinforcing layer in rubber is disclosed in which each of the steel cords has a multilayer structure composed of a core layer made of a number of element wires twisted together, and at least one sheath layer made of a larger number of element wires surrounding the core layer. The ends of some of the element wires are located at a distance of 1 to 10 mm from those of the other element wires in the longitudinal direction of each of the steel cords at the end portion thereof so that the end portion is unflat.

4 Claims, 1 Drawing Sheet

PNEUMATIC TIRE REINFORCED BY STEEL CORDS WITH TAPERED ENDS

This application is a continuation of application Ser. No. 07/113,966, filed 10/29/87 now abandoned.

BACKGROUND OF THE INVENTION

The present invention relates to a pneumatic tire reinforced by steel cords, and particularly relates to a pneumatic tire for a motor vehicle, in which the cut-off ends of steel cords are caused to adhere to rubber well enough to enhance the durability of the tire.

In a conventional pneumatic tire for a motor vehicle, a reinforcing layer of steel cords is embedded in rubber for a carcass, a belt, a chafer or the like. Since the modulus of elasticity of the steel cords is very high, the steel cords embedded in the rubber act to suppress the deformation of the tire. However, since the difference between the modulus of elasticity of steel cords and that of the rubber is large, there is a drawback that a shearing force acts to the mutually stuck surfaces of the rubber and each of the steel cords in the longitudinal direction of the steel cord to separate the mutually stuck surfaces from each other. For that reason, the steel cord is plated with brass to heighten the sticking power between the rubber and the steel cord.

Since the element wires of each of the steel cords, which are embedded in the rubber of the conventional pneumatic tire, are plated with the brass except the cut-off ends of the element wires, the sticking power between the rubber and each of the element wires is heightened so that the rubber and the element wire are prevented from being separated from each other. However, since the cut-off ends of the element wires are not plated with the brass and are gathered to form a plane, the sticking power between the rubber and the cut-off ends is very low so that the rubber and each of the cut-off ends are likely to be separated from each other. Besides, since the difference between the modulus of elasticity of the rubber and that of the steel cords is large, as mentioned above, a local large strain is likely to be caused in the rubber at the cut-off end of each of the element wires to partially crack the rubber. Therefore, there is a problem that if such strain is repeatedly caused, the rubber is separated from the cut-off end portion of each of the steel cords in a short period of tiem.

It was disclosed in the Japanese Patent Application No. 28882/80 now Japanese patent No. 55-28882 that the ends of the element wires of each of steel cords are dispersed as a bamboo broom to heighten the sticking power between rubber and each of the ends of the element wires. In that case, however, troublesome work such as reducing the ratio of formation of the steel cords and increasing the twisting pitch on the steel cords needs to be done.

OBJECTS AND SUMMARY OF THE INVENTION

Accordingly, it is an object of the present invention to provide a pneumatic tire which is easy to be manufactured and in which the sticking power between rubber and each of the cut-off ends of steel cords is heightened to make it less likely that the rubber is separated from the cut-off ends of the steel cords.

In the pneumatic tire provided in accordance with the present invention, the steel cords are embedded as a reinforcing layer in the rubber. The pneumatic tire is characterized in that each of the steel cords has a multilayer structure composed of a core layer made of a number of element wires twisted together, and at least one sheath layer made of a larger number of element wires surrounding the core layer; and the ends of some of the element wires of each of the steel cords are located at a distance of 1 to 10 mm from those of the other element wires thereof in the longitudinal direction of the steel cord so that the end portion of the steel cord is unflat. The sheath layer has a diameter which is at least equal to the diameter of the end portion of the core layer. In order to make the end portion of the steel cord unflat, the ends of the element wires of the core layer and those of the element wires of the sheath layer may be located stepwise to each other or the ends of the element wires of the core layer or the sheath layer may be alternately located zigzag as to every other ends, every pair of ends or the like.

Since the cut-off ends of the element wires, which have lower sticking power to the rubber, are dispersed in the longitudinal direction of the steel cord, the decrease in the sticking power between the rubber and the cut-off ends of the element wires is reduced and the flexural rigidity of the end portion of the steel cord is lowered to diminish the difference between the elasticity of the rubber and that of the steel cord. However, if the distance between the dispersed cut-off ends of the element wires were less than 1 mm, the above-mentioned effects would hardly be produced. If the distance were more than 10 mm, it would be difficult to twist the element wires together to manufacture the steel cord.

When the element wires are twisted together to manufacture the steel cord, the tension of some of the element wires is set to be 1.03 to 1.2 times higher than that of the other element wires so that the element wires of the higher tension contract as the element wires are cut off.

If the distance between the dispersed cut-off ends of the element wires were to be made more than 10 mm, the tension of the element wires expected to contract would need to be set to be more than 1.2 times higher than that of the other element wires. In that case, the element wires of the higher tension would be likely to be cut off due to the tension.

Since the steel cord has the multilayer structure, it is easy to set the tension of the sheath layer to be higher than that of the core layer. For that reason, it is easy to manufacture the steel cord.

DESCRIPTION OF THE PREFERRED EMBODIMENTS

Embodiments of the present invention are hereafter described with reference to the drawings.

Figure 1:
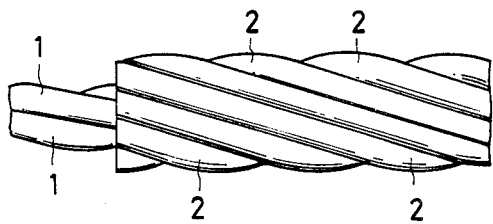
FIG. 1 shows a front view of a steel cord which is an embodiment of the present invention.
Figure 2:
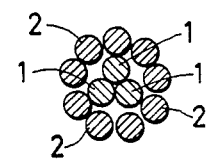
FIG. 2 shows a cross-sectional view of the steel cord.

FIGS. 1 and 2 show one of the embodiments, which has a steel cord comprising a core layer of three twisted element wires 1 and a sheath layer of nine twisted element wires 2 twisted outside the core layer in the same direction as the element wires 1 of the core layer but at a pitch different from that of the element wires 1 thereof. The element wires 1 of the core layer project from the ends of the element wires 2 of the sheath layer.

Figure 3:
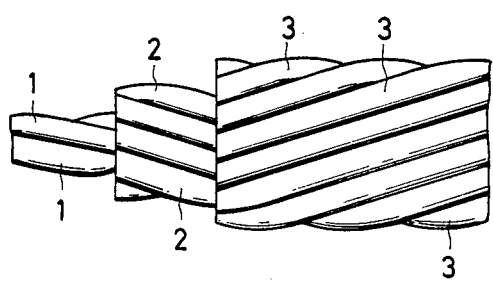
FIG. 3 shows a front view of a steel cord which is another embodiment of the present invention.
Figure 4:
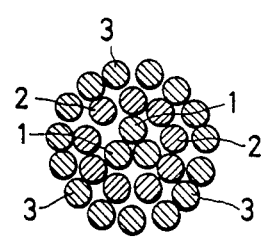
FIG. 4 shows a cross-sectional view of the steel cord shown in FIG. 3.

FIGS. 3 and 4 show another one of the embodiments, which has a steel cord comprising a core layer of three twisted wires 1, an inner sheath layer of nine twisted element wires 2 twisted outside the core layer in the same direction as the element wires 1 of the core layer but at a pitch different from that of the element wires 1 thereof, and an outer sheath layer of fifteen twisted element wires 3 twisted outside the inner sheath layer in a direction inverse to that of the element wires of both the core layer and the inner sheath layer. The element wires 2 of the inner sheath layer project from the ends of the element wires 3 of the outer sheath layer. The element wires 1 of the core layer project from the ends of the element wires 2 of the inner sheath layer.

Figure 5:
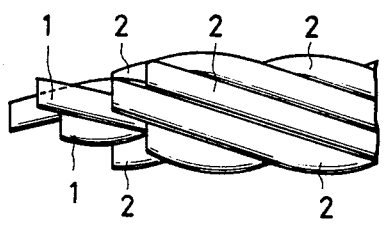
FIG. 5 shows a front view of a steel cord which is still another embodiment of the present invention.

FIG. 5 shows still another one of the embodiments, which has a steel cord comprising a core layer of three twisted element wires 1 and a sheath layer of nine twisted element wires 2 twisted outside the core layer in the same direction as the element wires 1 of the core layer but at a pitch different from that of the element wires 1 thereof. The ends of the three element wires 1 of the core layer are located at a distance from each other. The ends of the nine element wires 2 of the sheath layer are alternately located at a distance from each other. The end portion of each of the core layer and the sheath layer is thus made unflat.

Figure 6:
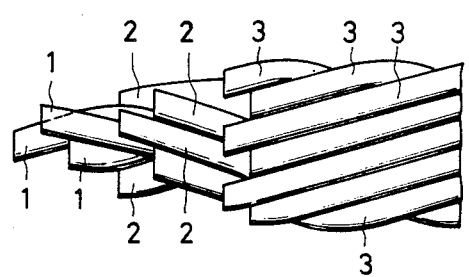
FIG. 6 shows a front view of a steel cord which is still another embodiment of the present invention.

FIG. 6 shows still another one of the embodiments, which has a steel cord comprising a core layer of three twisted element wires 1, an inner sheath layer of nine twisted element wires 2 twisted outside the core layer in the same direction as the element wires 1 of the core layer but at a pitch different from that of the element wires 1 thereof, and an outer sheath layer of fifteen twisted element wires 3 twisted outside the inner sheath layer in a direction inverse to that of the element wires 1 and 2 of the core layer and the inner sheath layer. The element wires 2 of the inner sheath layer project from the ends of the element wires 3 of the outer sheath layer. The element wires 1 of the core layer project from the ends of the element wires 2 of the inner sheath layer. Each of the end portions of the core layer, the inner sheath layer and the outer sheath layer is made unflat.

A steel cord of 1.06 mm in diameter was composed of a core layer of three twisted element wires 1, an inner sheath layer of nine twisted element wires 2 and an outer sheath layer of fifteen element wires 3. Each of the element wires 1, 2 and 3 was a steel wire having a diameter of 0.175 mm and plated with a brass consisting of 67% of copper and 33% of zinc. A net was woven from such steel cords so that the density of the steel cords is 5.1 cords per centimeter or 13 cords per inch. The net was rubberized. The rubberized net was used as a carcass ply to manufacture a radial tire of the 1000R20 size for a truck or a bus. The tensions of the element wires 1, 2 and 3 were set at different values in twisting the element wires, so that a kind of three radial tires (each of which was an embodiment 1 of the present invention) having steel cords whose cut-off ends were as shown in FIG. 3, another kind of three radial tires (each of which was another embodiment 2 of the present invention) having steel cords whose cut-off ends were as shown in FIG. 6, and still another kind of three radial tires (each of which was a comparative example 1) having steel cords whose cut-off ends were made flat, were manufactured. These radial tires were subjected to a drum test (speed of 35 km/h., load of 5,500 kg and internal pressure of 9.0 kg/cm$^2$) as to the conditions of the carcasses of the tire. TAB. 1 shows the results of the drum test. The distance between the element wires, which is shown in TAB. 1, was that between the ends of the core layer and that of each sheath layer.

TABLE 1

|  |  | Embodiment | | Comparative example |
|---|---|---|---|---|
|  |  | 1 | 2 | 1 |
| Structure of cord |  | (3 + 9 + 15) × 0.175 | | |
| Tension (index) of element wire in twisting | Core | 100 | 100 | 100 |
|  | Inner sheath | 105 | 105~110 | 100 |
|  | Outer sheath | 110 | 110~115 | 100 |
| Distance (mm) between wires | Core | 0 | 0 | 0 |
|  | Inner sheath | 3 | 2~6 | 0 |
|  | Outer sheath | 7 | 7~10 | 0 |
| Kilometers run until cracking | No. 1 | No cracking until 50,000 km run | | 28,000 |
|  | No. 2 |  | | 35,000 |
|  | No. 3 |  | | 41,000 |

It is understood from TAB. 1 that the kilometers run by each of the radial tires which were the embodiments 1 and 2 were at least 9,000 km more than that run by the conventional radial tire which was the comparative example 1, and the life of each of the radial tires which were the embodiments 1 and 2 was lengthened by at least 20% in comparison with the conventional radial tire which was the comparative example 1.

A steel cord of 1.13 mm in diameter was composed of core layer of three twisted element wires 1 of 0.20 mm in diameter and a sheath layer of six twisted element wires 2 of 0.35 mm in diameter. Each of the element wires 1 and 2 was plated with a brass. A net was woven from such steel cords so that the density of the steel cords was 5.1 cords per centimeter or 13 cords per inch. The net was rubberized. A belt was made of four layers of such rubberized nets to manufacture a radial tire of the 1000R20 size for a truck or a bus. The tensions of the element wires 1 and 2 were set at different values in twisting the element wires, so that a kind of three radial tires (each of which was an embodiment 3 of the present invention and had steel cords which were as shown in FIG. 1), another kind of three radial tires (each of which was an embodiment 4 of the present invention and had steel cords which were as shown in FIG. 5) and still another kind of three radial tires (each of which was a comparative example 2) were manufactured. These radial tires were subjected to a drum test (speed of 60 km/h., load of 2,800 kg and internal pressure of 7.25 kg/cm$^2$) as to the conditions of the belts of the tires. TAB. 2 shows the results of the drum test.

TABLE 2

|  |  | Embodiment | | Comparative example |
|---|---|---|---|---|
|  |  | 3 | 4 | 2 |
| Structure of cord |  | 3 × 0.20 + 6 × 0.35 | | |
| Tension (index) of element wire in twisting | Core | 100 | 100 | 100 |
|  | Sheath | 110 | 105~115 |  |
| Distance (mm) between wires | Core | 0 | 0 | 0 |
|  | Sheath | 3 | 2~6 | 0 |

TABLE 2-continued

|  |  | Embodiment | | Comparative example |
|---|---|---|---|---|
|  |  | 3 | 4 | 2 |
| Kilometers run until separation of belt | No. 1 | No separation until 100,000 km run | | 76,000 |
|  | No. 2 | | | 82,000 |
|  | No. 3 | | | 91,000 |

It is understood from TAB. 2 that the kilometers run by each of the radial tires which were the embodiments 3 and 4 were at least 9,000 km more than that run by the radial tire which was the comparative example 2, and the life of each of the radial tires which were the embodiments 3 and 4 was lengthened by at least 10% in comparison with that of the radial tire which was the comparative example 2.

According to the present invention, a pneumatic tire is provided with steel cords, each of which has a multilayer structure and is embedded in at least one of a carcass, a belt, a chafer and the like. At the cut-off end of each of the steel cords at the side edge of the carcass or the like, the ends of some of the element wires of the steel cord are located at a distance of 1 to 10 mm from those of the other element wires thereof in the longitudinal direction of the steel cord so that the unplated ends of the element wires are dispersed. As a result, the sticking power between the rubber of the pneumatic tire and the ends of the steel cords thereof is made higher than that between the rubber of a conventional pneumatic tire and the ends of the steel cords thereof, in which the ends of element wires are gathered on a plane. Besides, the difference between the rigidity of the rubber of the pneumatic tire provided in accordance with the present invention and the end portions of the steel cords thereof is reduced. For these reasons, the incidence of separation of the rubber from the steel cords and that of cracking of the rubber are decreased, namely, the durability of the tire is enhanced, so that the life of the tire is lengthened by at least 10% in comparison with the conventional pneumatic tire.

Since the pneumatic tire provided in accordance with the present invention has the multilayer structure made of the twisted steel cords, a tension difference can be set between the element wires of each of the steel cords in twisting the element wires, so that the ends of the element wires are automatically located at a distance from each other as the element wires are cut off after the steel cords are rubberized. For that reason, it is easy to manufacture the pneumatic tire.

I claim:

1. A pneumatic tire reinforced by steel cords embedded as a reinforcing layer in rubber, wherein each of said steel cords has a multilayer structure composed of at least one core layer made of a number of element wires twisted together, and at least one sheath layer along the length of the cord made of a larger number of element wires surrounding said core layer, said sheath layer having a first outer diameter, and the ends of at least one of said element wires of said core are projected out a distance of 1 to 10 mm from the ends of the remaining wires of said cord in the longitudinal direction of said cord at an end portion of the cord so that said end portion has an unflat surface, so that the outer diameter of said end portion is not greater than said first outer diameter of said sheath layer.

2. A pneumatic tire according to claim 1, wherein all the ends of the element wires of the core layer project by 1 to 10 mm from the ends of the element wires of the sheath layer.

3. A pneumatic tire according to claim 1, wherein additionally the ends of a plurality of element wires of at least one of the core layer and the sheath layer project by 1 to 10 mm from the ends of the remaining element wires of said at least one of said core layer and sheath layer respectively.

4. A pneumatic tire according to claim 3, wherein all the ends of the element wires of the core layer project by 1 to 10 mm from the ends of the element wires of the sheath layer.

* * * * *